United States Patent [19]
Cobb et al.

[11] Patent Number: 5,097,529
[45] Date of Patent: Mar. 17, 1992

[54] SPACE-SAVING OPTICAL FIBER CABLE CLOSURE

[75] Inventors: Gary S. Cobb, Norcross; Lawrence R. Dunn, Flowery Branch; Melvin W. Evers; Wesley W. Jones, both of Lawrenceville, all of Ga.

[73] Assignee: AT&T Bell Laboratories, Murray Hill, N.J.

[21] Appl. No.: 673,880

[22] Filed: Mar. 22, 1991

[51] Int. Cl.[5] .............................................. G02B 6/36
[52] U.S. Cl. .................................................. 385/135
[58] Field of Search ............... 350/96.20, 96.21, 96.22, 350/96.23

[56] References Cited

U.S. PATENT DOCUMENTS

| | | | |
|---|---|---|---|
| 3,518,358 | 6/1967 | Brown | 174/138 |
| 4,254,865 | 3/1981 | Pacey et al. | 206/316 |
| 4,610,738 | 9/1986 | Jervis | 156/49 |
| 4,909,756 | 3/1990 | Jervis | 439/521 |
| 4,913,522 | 4/1990 | Nolf et al. | 350/96.20 |
| 4,927,227 | 5/1990 | Bensel, III et al. | 350/96.20 |

FOREIGN PATENT DOCUMENTS

| | | | |
|---|---|---|---|
| 2527343 | 11/1983 | France | 350/96.20 |
| 60-136705 | 7/1985 | Japan | 350/92.23 |

OTHER PUBLICATIONS

G. S. Cobb, et al., *Fiber-To-The-Home Update: Drop Installation Flexibility*, 38th International Wire & Cable Symposium, 1989.

*Primary Examiner*—Frank Gonzalez
*Attorney, Agent, or Firm*—Edward W. Somers

[57] ABSTRACT

An optical fiber cable closure (20) includes a cable termination assembly (26) and a cover (28) into which the termination assembly is inserted. The cable termination assembly includes an end plate assembly (34) through which distribution cables (21,22) to be spliced extend. From the end plate is cantilevered a distribution portion (106) which supports an optical fiber organizer (115). Mounted on the fiber organizer adjacent to a longitudinal edge thereof are a plurality of stacked organizing modules (120,120). Each module includes a plurality of nests (134-134) for receiving splicing devices such that the axes of the fibers in the devices are parallel to each other and to an axis of the closure. Optical fibers from each incoming cable are routed in individual bundles or as ribbons from the distribution portion to selected ones of the modules. The stacked organizing modules are held spaced above the fiber organizer to allow fiber to become routed therebetween thereby allowing a radius of curvature which exceeds that if the fiber had been routed between the stack of modules and an opposite longitudinal edge.

17 Claims, 6 Drawing Sheets

SPACE-SAVING OPTICAL FIBER CABLE CLOSURE

TECHNICAL FIELD

This invention relates to a space-saving optical fiber cable closure having enhanced storage capability. More particularly, the invention relates to a closure for optical fiber cables which is capable of storing a relatively large number of optical fiber splices, which is relatively small in size and which is relatively low in cost.

BACKGROUND OF THE INVENTION

The use of communication cables which include a plurality of optical fibers is rapidly expanding. An optical fiber cable may comprise a plurality of glass fibers each of which is protected by at least one layer of a coating material. The optical fibers may be assembled into units in which the fibers are held together by binder ribbons or tubes to provide a core. Another optical fiber cable core includes a ribbon type optical fiber arrangement in which a plurality, such as twelve fibers for example, are arrayed together side by side. A plurality of these fiber ribbons may be stacked to obtain a high fiber count cable. The core is enclosed by a plastic tube and a plastic jacket. Ribbon type cable in which a relatively large number of readily accessible optical fibers may be packaged appears to be ideally suited for fiber-in-the-loop use.

Whatever the structure of a cable, there must be provisions for splicing transmission media at an end of a given length of cable to corresponding transmission media at an adjacent end of another length of cable. In wire-like metallic conductor communication practice, it is conventional to use a splice closure, within which all conductors are spliced, wrapped and stored and protected environmentally.

During the splicing of metallic conductors, it is customary to bend sharply the conductors, to provide access to other connections. The physical nature of glass optical fibers forecloses the adoption of splicing techniques which are used with metallic conductors within such a splice closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, expected lives of the fibers will be reduced if bent to less than the minimum bending radius. Generally, the radius to which the optical fiber can be bent without affecting orderly transmission is substantially greater than that radius at which the optical fiber will break. Whereas glass and silica, the materials used to make optical fibers, are in some respects stronger than steel, optical fibers normally do not possess this potential strength because of microscopic surface fractures, which are vulnerable to stress and spread, causing the fiber to break easily.

It should be clear that, an optical fiber cable does not lend itself to the splicing practices of wire-like communication conductors. The individual glass fibers cannot just be twisted, tied, wrapped and moved into a splice closure, in anything like the manner of wire-like metallic conductor cables. These small diameter glass fibers cannot be crimped or bent at small angles, without breakage. Inasmuch as glass fibers have memory and tend to return to a straight-line orientation, placement in a splice closure becomes somewhat difficult. Moreover, the interconnection of optical fibers is a precision operation which is somewhat difficult to perform within a manhole, or at pole-suspension elevation, for example. These problems are particularly acute in multifiber cables where individual optical fibers must be spliced in a manner which allows repairs and rearrangements to be made in the future.

In addition, fiber slack normally must be provided adjacent to splices. When splicing optical fibers by mechanical means or by fusion, it becomes necessary to provide enough slack fiber so that the fiber can be pulled out of a closure for the preparation of fiber ends and the joining together. This requires at least about 0.5 meter of fiber from each cable to be stored in the splice closure when the closure is sealed, that is when the splicing has been completed. For a multifiber cable there must be a method of storing this slack, of protecting the splices and of keeping the fibers together in an orderly manner. The splices should be easily accessible to facilitate the rearrangement of the optical fibers and splices. The need to store the slack further complicates the problem of providing a suitable optical fiber closure.

Furthermore, there are a number of different kinds of splicing arrangements which are used commercially. Desirably, a closure should be capable of accommodating at least the more popular of these splicing arrangements.

Also, there is a need for a closure which is particularly suited in the fiber-in-the-loop market and to splice relatively small count optical fiber cables some of which are referred to as drop cables. For such a use, what is sought after is a closure that is relatively inexpensive to serve this very large market. Also, desirably, the sought after closure is relatively small in size yet able to accommodate a relatively large number of splices.

As might be expected, fiber splice closures are available in the prior art. Some of these prior art closures have shortcomings. Typically, they have been somewhat complex, difficult to use and difficult to access. Some prior art splice closures have included organizers which have tended to place higher than desired stresses on the optical fibers, resulting in fiber damage. In addition, these prior art closures often have failed to provide simple to use, positive means for routing the optical fibers in an effective manner and for storing slack.

For example, a splice closure with a central transverse bulkhead has been used. Individual fibers are spliced and are attached to the bulkhead for support. A disadvantage of this approach is the lack of facilities for the storage of slack in the fibers. In other splicing arrangements, all the optical fibers in a cable are looped within the same retainer or fiber slack is stored on spools. In either case, identification, repair or splice work of individual fibers is extremely difficult without a major rearrangement within the splice closure. This is undesirable because the transmission capability in active fibers can be affected as they are moved.

In another closure of the prior art, there is provided a device having a modular construction which is suitable for installation in standard splice closures. The device comprises a plurality of tray-like members each adapted to retain and store at least one fiber. The device provides access to the individual fibers contained in the trays. The trays are stacked one on top of the other, and each is hinged separately at one end thereof to a carrier, thus allowing them to move relative to one another like bound pages. Each tray-like support has a width which is adequate to provide the minimum bending radius specified for that fiber.

In another prior art optical fiber cable closure, optical fiber transitions with a controlled bend radius are anchored from each cable to a hinged organizer tray. This arrangement provides ready access to in-service optical fibers without the risk of inadvertent bending of the fibers. However, the arrangement of optical fibers in a cable to different trays is somewhat cumbersome to carry out and there appears to be a lack of protection for the fibers in the transition from the cables to the trays. This problem has been solved by the arrangement shown in U.S. Pat. No. 4,927,227, which issued on Apr. 22, 1990 in the names of W. H. Bensel, et al. Therein, a support member includes a base for supporting an optical fiber breakout and a plurality of splice trays. The breakout allows a user to separate fibers into groups before they are routed to ones of the trays.

In still another closure, a tubular cover having a closed end and an open end is adapted to receive and be sealed to a cable termination assembly. The cable termination assembly includes cable entry facilities through which the cables to be spliced are routed. A support member extends from the cable entry facilities and has a free end disposed adjacent to the closed end of the cover. The support member includes a support base for supporting an optical fiber breakout and a plurality of optical fiber splice trays.

Mounted centrally of each tray is at least one organizing module each of which is capable of holding a plurality of optical fiber connective arrangements. Each module is such that it is capable of accommodating different kinds of connective arrangements such as, for example, fusion splices and cleave, sleeve, and leave splicing connectors. Each tray is capable of holding a plurality of organizing modules which may be added as needed. Although this last-described closure has enhanced storage capability both in number and in kind, which is ideal for high density applications, it is larger and has more storage capability than is needed for a market such as fiber-in-the-loop and for splicing small fiber count cables.

What the prior art seemingly lacks is an optical fiber cable closure which is relatively small in size and which is relatively inexpensive. The sought after closure should have suitable storage capability and also the capability to store different kinds of splicing arrangements.

SUMMARY OF THE INVENTION

The foregoing problems of the prior art have been overcome with the closure of this invention. An optical fiber cable closure of this invention includes a cover having a closed end and an open end with an axis extending from the open end to the closed end, and a cable termination assembly which is adapted to become disposed within and secured to the cover. The cable termination assembly includes a cable entry portion through which cables to be provided with connective arrangements are routed into the closure, and optical fiber support means which extends from and is connected to the cable entry portion and which has a free end adapted to be disposed adjacent to the closed end of the cover. The optical fiber support means includes at least one splice organizing module or holder which is mounted to the optical fiber support means adjacent to an outer edge thereof which is parallel to the axis such that fiber to be connected in each module is routed in paths on the fiber support means. Each of the paths has a radius of curvature which exceeds a minimum bend radius of the fiber. Each module includes facilities for holding a plurality of optical fiber connective arrangements which may include different kinds of connective devices and which are such that the longitudinal axes of the fibers in each connective arrangement are parallel to each other and parallel to the axis of the closure.

In the preferred embodiment, the optical fiber support means includes a distribution portion which is connected to and cantilevered from the cable entry portion, and fiber organizing means mounted to the distribution portion and cooperating with the distribution portion to provide a chamber for holding excess fiber length. The fiber organizing means is capable of holding a plurality of the organizing modules in stacked relationship to one another.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
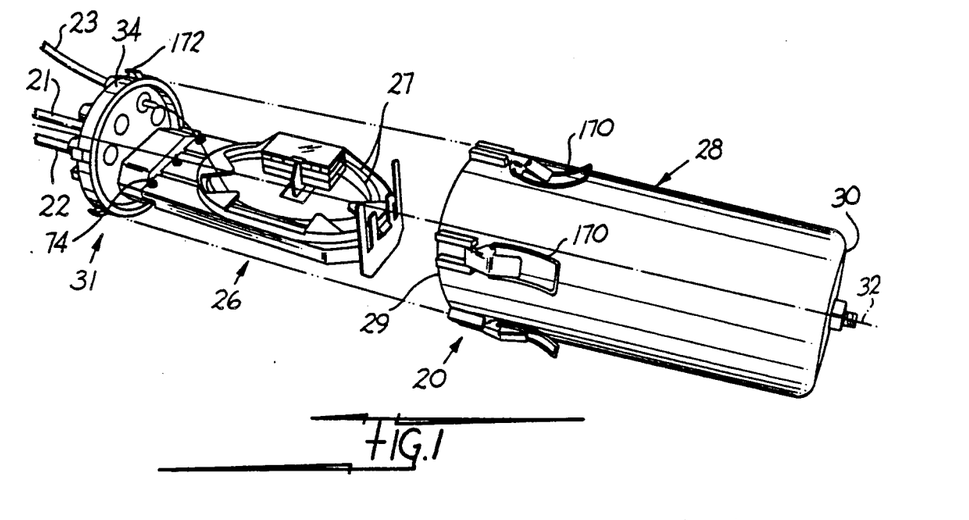
FIG. 1 is an exploded overall perspective view of a closure of the invention which includes a cable termination assembly and a cover.
Figure 2:
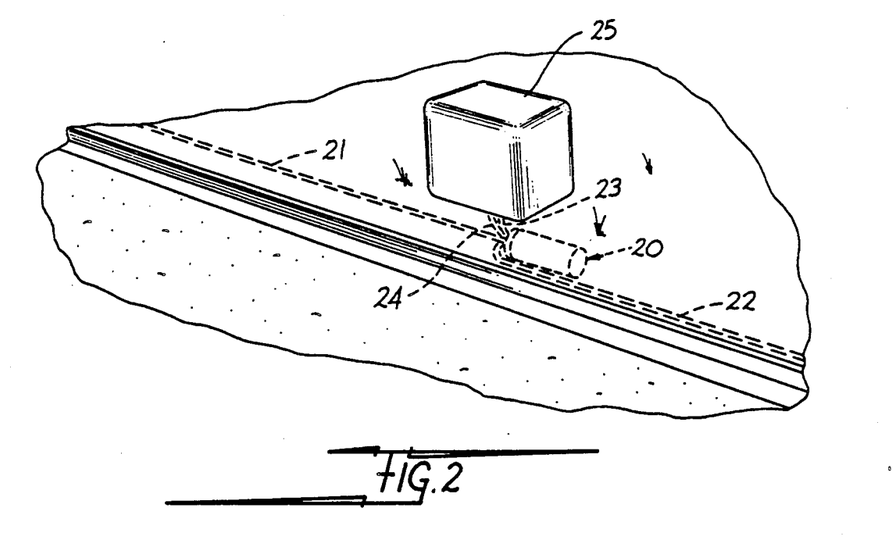
FIG. 2 is a schematic view of a closure of this invention in a typical environment of use.

Referring now to FIG. 1 there is shown an optical fiber cable closure which is designated generally by the numeral 20. The closure 20 is suitable, for example, for use in fiber-in-the-loop. For example, in FIG. 2 there is shown a closure 20 in which distribution cables 21 and 22 extend into the closure and are spliced to drop cables 23 and 24 which extend from the closure to a customer or to a distant terminal 25. From the distant terminal, media (not shown) extend to the customer.

The closure 20 includes a cable splicing termination assembly which is designated generally by the numeral 26 (see FIGS. 1, 3 and 4) and in which optical fibers 27—27 are spliced and/or stored and a cover 28. The cover 28 is cylindrically shaped and includes an open end 29 and a closed end 30. An axis 32 of the closure extends from the open end 29 of the cover to the closed end 30. In order to assemble the cable splicing termination assembly 26 with the cover 28, the cable splicing termination assembly is inserted into the open end 29 of the cover and moved toward the closed end.

As also can be seen in FIG. 1, the cable splicing termination assembly 26 includes a cable entry portion 31. The cable entry portion 31 includes an end plate assembly 34 a portion of which is disc-shaped. The end plate assembly 34 preferably is made of a molded, glass-reinforced plastic material.

Figure 3:
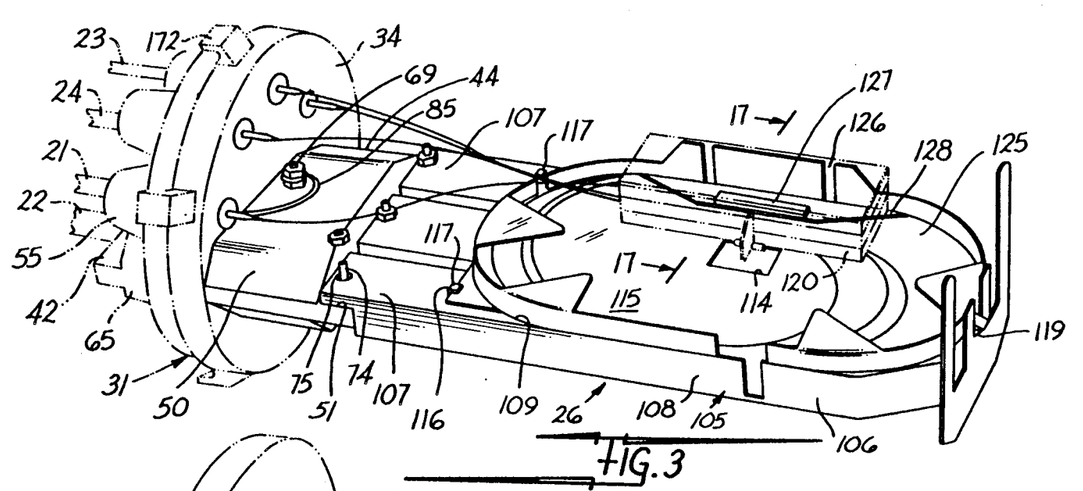
FIG. 3 is an enlarged perspective view of a portion of the closure of FIG. 1.
Figures 5, 6, 7, 8:
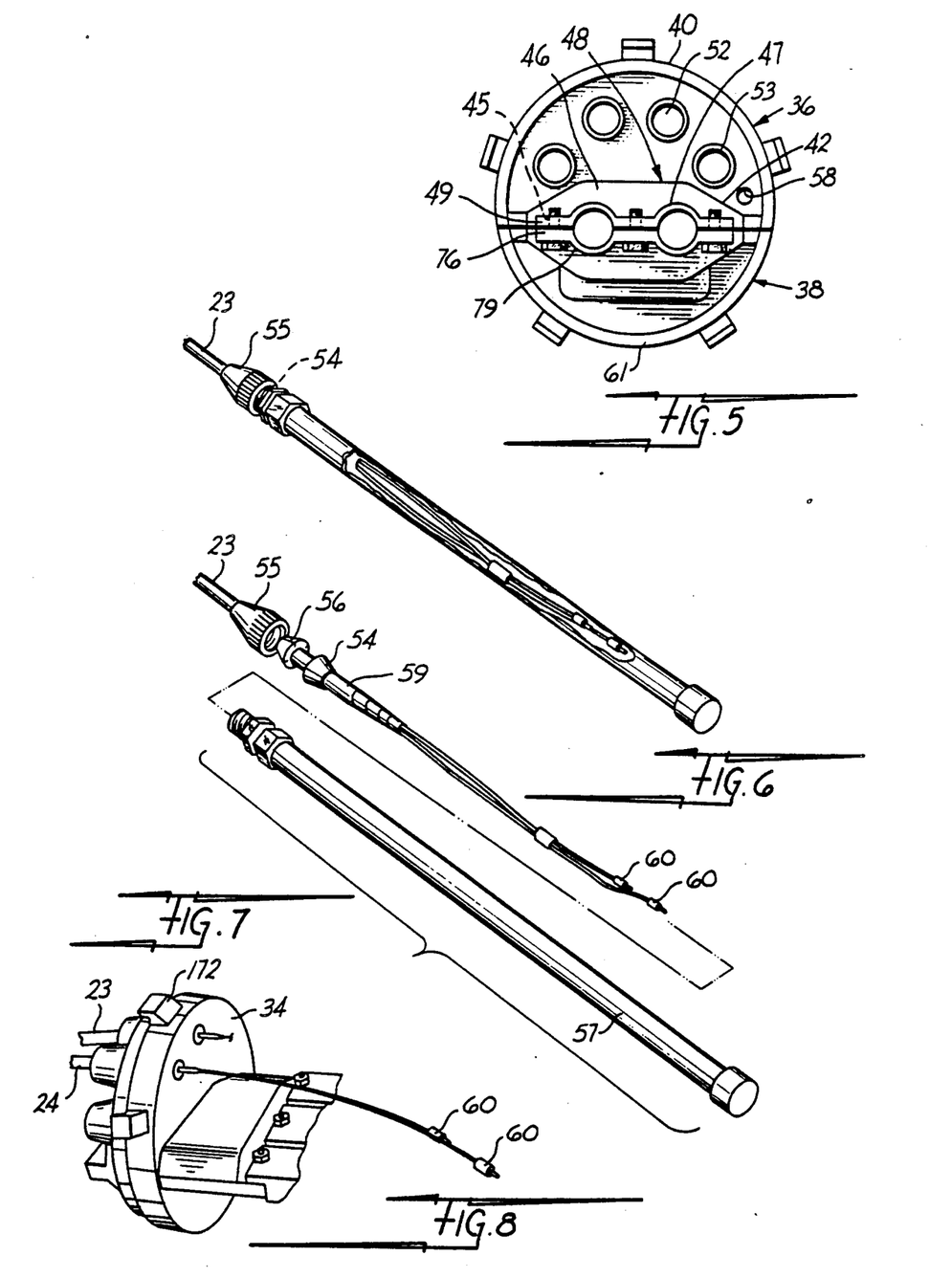
FIG. 5 is an end view of an end plate assembly of the closure of FIG. 1.
FIG. 6 is a perspective view of an end portion of a preterminated drop cable.
FIG. 7 is a perspective exploded view of the preterminated drop cable of FIG. 6.
FIG. 8 is a perspective view of the end plate assembly with a preterminated end portion of a drop cable extending therethrough.

Each end plate assembly 34 includes two portions 36 and 38 (see FIG. 5). The portion 36 includes a partially circular flange 40, an outwardly projecting portion 42 and an inwardly projecting portion 44 (see also FIG. 3). The outwardly projecting portion 42 includes a housing portion 46 (see FIG. 5) having an extension which is designated generally by the numeral 48. The extension 48 includes two semi-circular conduits 47—47 which are disposed between landings 49—49 of the extension. Each of the landings 49—49 is provided with a threaded opening 45. As can be seen in FIG. 3, the inwardly extending portion 44 includes a housing portion 50 from which extends a landing portion 51 comprising spaced ears.

Also included in the portion 36 are four openings 52—52, from each of which on an external side of the end plate assembly 34 extends an externally threaded nipple 53 (see FIG. 5). Each of the openings is adapted to allow a preterminated drop cable to extend therethrough. An inner end of each opening 52 is threaded internally. Each nipple is adapted to receive a rubber-like sheath sealing plug 54 (see FIGS. 6 and 7) and to have a compression collar 55 (see also FIG. 3) turned threadably thereover to seal the closure. The compression collar 55 includes a portion 56, which, when the collar is turned, grips the cable and prevents undesired pullout and/or rotation.

When it is desired to extend a drop cable into the closure, a craftsperson removes an assembly comprising a protective tube 57 which includes a cap (see FIG. 7) from an end portion of the drop cable which may have fiber preterminated with ST ® connectors 60—60, for example, and with a portion of the sheath thereof removed. The preterminated drop cables each include an end portion which extends through a compression collar 55, a grip portion 56 and a sealing plug 54 and through waterblocking provisions 59. The waterblocking provisions may be those described in copending application Ser. No. 07/443,300 filed on Nov. 29, 1989 in the name of G. S. Cobb (still pending). The end portion of the drop cable is inserted through the end plate assembly 34 (see FIG. 8) and then the plug 54 is inserted into the nipple and the compression collar 55 turned threadably onto the nipple 53 to compress the rubber-like plug about the cable to seal the cable at its passage through the end plate assembly.

The portion 36 of the end plate assembly also includes a relatively thin web 58 (see FIG. 5) having a generally circular configuration. Advantageously, the web 58 is sufficiently thin to allow it to be removed easily to allow a rubber bushing to be inserted into the end plate assembly 34 and an external ground wire to be extended through the bushing.

Figure 9:
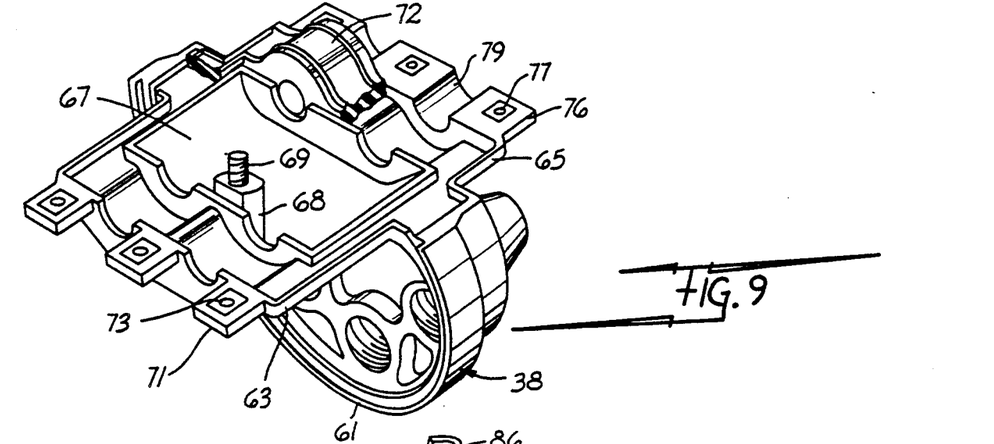
FIG. 9 is an enlarged perspective view of a portion of the end plate assembly of FIG. 5.

As mentioned earlier, the end plate assembly 34 also includes a portion 38. The portion 38 includes an arcuately shaped flange 61 (see FIGS. 5 and 9) having inner and outer portions 63 and 65 projecting therefrom (see FIG. 9). The inner portion 63 includes a housing portion 67 which includes a post 68 disposed therein and from which a threaded stud 69 extends upwardly.

Also, the inner portion 63 includes three spaced ears 71—71 projecting inwardly longitudinally of the closure. Each ear 71 includes an opening 73 therein. When the portion 38 is assembled to the portion 36 to complete the circular flange to which is to be secured the cover, the openings 73—73 are aligned with threaded openings 75—75 (see FIG. 3) which are formed in the ears of the landing 51 to permit bolts 74—74 (see also FIG. 1) to be inserted through the openings 73—73 and turned into the threaded openings 75—75 of the ears. The outer portion 65 includes three spaced ears 76—76 each having an aperture 77 therein. Disposed between each two ears 76—76 is an arcuately formed surface 79 which when the portions 36 and 38 are assembled together cooperates with an arcuately shaped surface of the outwardly projecting portion 42 of the upper portion 36 to provide a conduit for a cable 21 or 22 to be spliced. Also, when the portions 36 and 38 are assembled together, the apertures 77—77 of the outer portion of the portion 38 become aligned with the threaded openings 45—45 in the outwardly projecting portion of the portion 36 so that bolts may be used to secure together the two outwardly extending portions.

A gasket 72 (see FIG. 9) is disposed between the portions 36 and 38 of the end plate assembly 34 to provide a seal between those two portions when assembled together and about the distribution cables which extend into the end plate assembly and about cable cores which extend out of the cable end plate assembly and farther into the closure. Different gaskets may be used to accommodate different cable sizes through the portions of the gaskets which are disposed in engagement with the arcuately formed surfaces of the housing portions. Shim washers (not shown) may be disposed over the threaded stud 69, depending on the size of cables used, in order to keep the cable cores centered within the openings in the interior housing portions.

As is seen in FIG. 1, two cables 21 and 22 extend through the end plate assembly 34, each one through a conduit formed between two arcuately shaped portions of the cooperating outwardly projecting portions of the portions 36 and 38 of the end plate assembly and then out from within the assembled housing portions 50 and 67 through the two exit ports formed by arcuately shaped portions of the inwardly projecting portions of the portions 36 and 38. Also extending through the end plate assembly 34 is one or more drop cables. As is seen, the end plate assembly 34 is adapted to permit as many as four drop cables to extend therethrough.

Figures 10, 11:
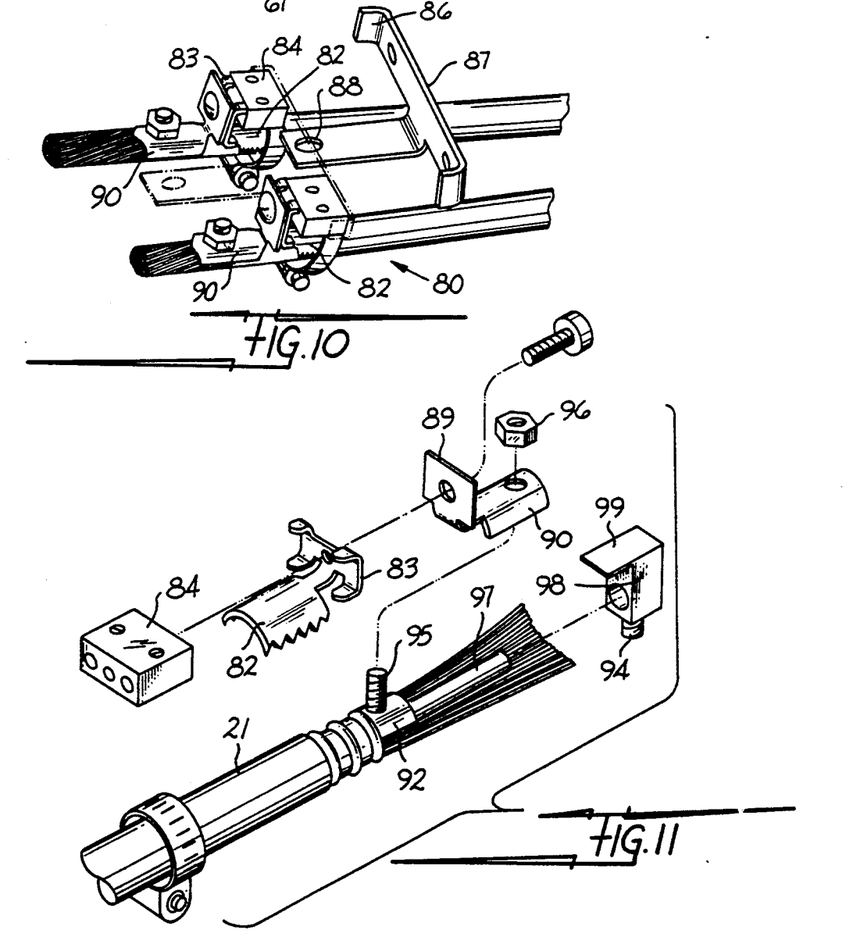
FIG. 10 is an enlarged perspective view of a cable gripping and electrical bonding arrangement which is disposed within a housing of the end plate assembly of FIG. 5.
FIG. 11 is an exploded perspective view of a ground clamp and strength member clamping device of the closure.

Internally of the housing formed between housing portions of the portions 36 and 38 are disposed sheath gripping arrangements designated generally by the numerals 80—80 (see FIGS. 10 and 11). Each sheath gripping arrangement 80 includes an arcuately shaped shoe plate 82 which engages a jacketed portion of a distribution cable, for example, cable 21, which extends into the housing. Each shoe plate is connected to a bifurcated upstanding leg 83 which is bolted to a block 84. Each block 84 is bolted to a T-shaped portion 86 of a metallic stabilizer bar 87 which itself has an opening 88. The stabilizer bar 87 is positioned in the housing to cause the threaded stud 69 to protrude through the opening 88 to receive a nut to fasten the stabilizer bar to the housing. Further, the stud 69 protrudes through an opening in the housing portion 50 and is used for grounding purposes. Metallic strength members of the cable may be turned upwardly and received between the bifurcated portions of the upstanding leg 83 and associated block 84. Fastened to an opposite side of the block 84 is an upstanding portion 89 of an electrical bonding device which includes a curved plate 90 which engages a plate 92 which has been inserted between a metallic shield of the cable and other components. A threaded stud 95 projects from the plate 92 through the plate 90 and is secured thereto by a nut 96. Should the cable include a central strength member 97 (see FIG. 11), a device 98 having an opening for receiving an end portion of the central strength member is positioned to cause an extending plate 99 to abut the stud 95. A set screw 94 is used to secure the central strength member within the device 98.

The stabilizer bar 87 performs several functions. It stabilizes the distribution cables 21 and 22 against rotation. Also, it prevents sheath pullout and provides electrical continuity from the distribution cables 21 and 22 to drop cables. The ground wires of drop cables are connected to the upstanding stud 69 and hence through the stabilizer bar to the bonding arrangements 80—80 to the cables 21 and 22.

As can be seen in FIG. 3 grounding wires 85—85 of drop wires which extend through the end plate assembly 34 and which are terminated in eyelets are connected to the threaded stud 69. This causes an electrical connection to be made between the drop cables and the distribution cables 21 and 22. Such an arrangement is called an internal grounding arrangement.

Figures 12, 13:
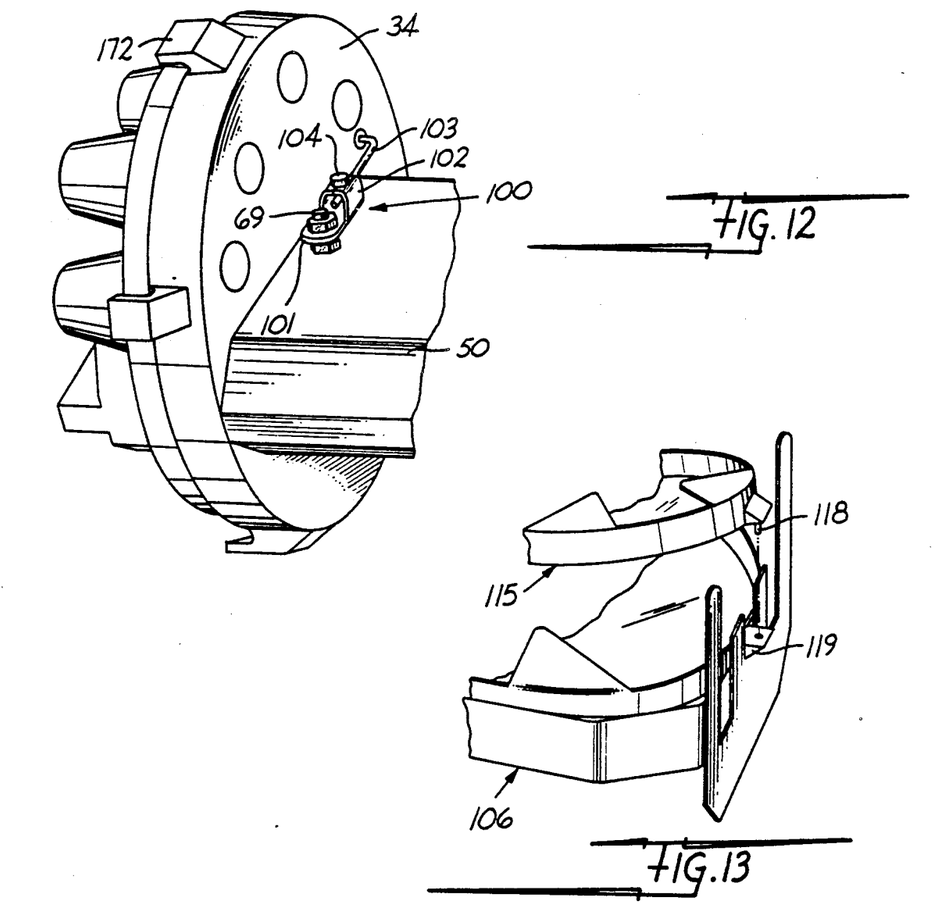
FIG. 12 is a perspective view of an external grounding arrangement.
FIG. 13 is a perspective view of end portions of the fiber organizer and distribution portions.

An external grounding arrangement also may be used. As can be seen in FIG. 12, an upper end of the threaded stud 69 extends through the housing portion 50 and has a grounding arrangement 100 connected thereto. The grounding arrangement 100 includes a foot 101 which extends from a box-like portion 102. An upper end of the stud 69 extends through an opening in the foot and is provided with a nut to secure the grounding arrangement to the top of the housing portion 50. A ground wire 103 which extends through the bushing in the opening 58 in the end plate 34 extends into the box-like portion 102 and is secured therein by a set screw 104.

Cantilevered from the end plate assembly 34 is an optical fiber support assembly 105 (see FIG. 3). The assembly 105 includes a distribution portion 106 which includes end portions 107—107 (see also FIG. 4) each of which is aligned with one of the spaced ears of the portions 36 and 38. A bolt 74 extends through each pair of aligned ears of the internal housing portions of the portions 36 and 38 of the end plate assembly 34 and associated end portion 107 with a nut being turned on to each bolt to secure the optical fiber support assembly to the end plate assembly.

Figure 4:
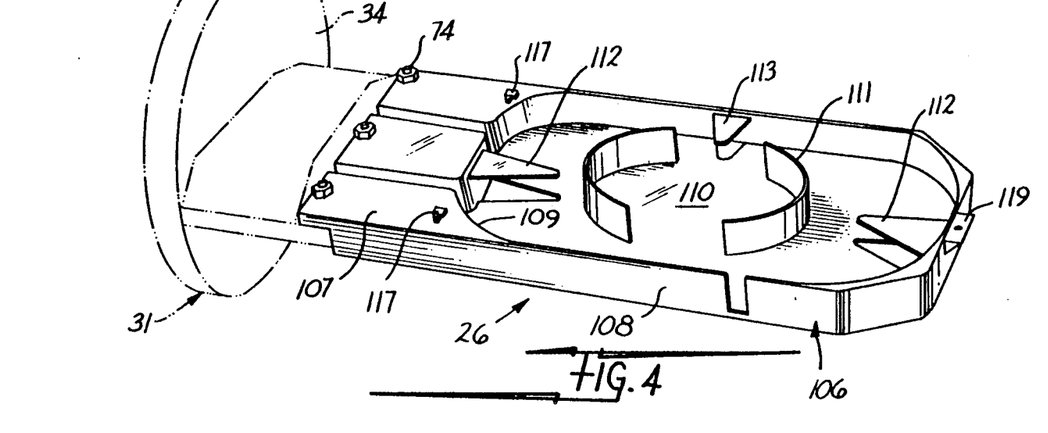
FIG. 4 is an enlarged perspective view of the portion of the closure of FIG. 3 with a fiber organizer portion removed to show a distribution portion.

The distribution portion 106 includes sidewalls 108—108 which are connected by an arcuately shaped end portion 109 and a base 110. Internally disposed within the distribution portion 106 between the sidewalls thereof are two arcuately configured partitions 111—111. At ends and sides of the distribution portion 106 are disposed overhanging portions 112—112 and 113—113, respectively. Excess fiber length conveniently may be stored within the distribution portion and arrangement to follow the curvature of the endwall and of the internally disposed partitions.

Adapted to be secured to the distribution portion 106 is a fiber organizer 115 (see FIG. 3) having a cutout 114. The fiber organizer includes cutout portions 116—116 which are received under portions 117—117 (see also FIG. 4) at one end of the distribution portion 106 and includes a compressible split finger 118 (see FIG. 13) at an opposite end. The split finger 118 is received within an opening of a bracket 119 of the distribution portion 106. As the split finger 118 is inserted into the opening in the bracket, the furcations are compressed and after a headed end has been moved through the opening in the bracket, the furcations move apart to lock the finger within the bracket and secure the organizer 115 to the distribution portion 106.

The fiber organizer 115 is adapted to support a plurality of connective organizer modules such as splice holders 120—120 (see FIGS. 3 and 14-17). Each splice holder 120 includes two spaced apart T-shaped projections 122—122 each of which is adapted to have a stem 124 thereof received slidably in a slot 126 (see FIG. 3) extending along the backwall of the organizer 115 normal to a base 125 of the fiber organizer. As a result, the splice holders are stackable one upon the other with a bottom one of the splice holders supported in engagement with a raised portion or platform 128 of the fiber organizer 115.

The small diameter optical fiber inadvertently may be moved beneath the bottom one of the splice holders and the platform 128, possibly resulting in damage to the fiber. In order to prevent this, a relatively thin, e.g. 1 mm, strip 127 of foam material is attached to a top surface of the platform 128. When a holder 120 or stack of holders 120—120 is secured to the fiber organizer, that holder 120 in engagement with the strip 127 compresses the foam and acts as a barrier to prevent any of the optical fibers from becoming disposed between the holder and the platform.

Figure 14:
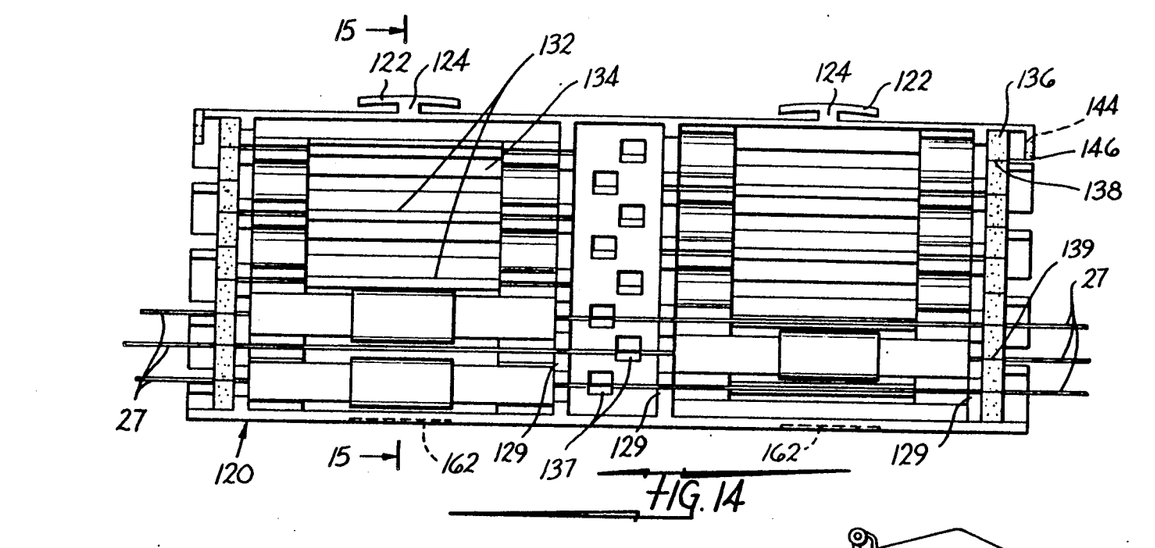
FIG. 14 is a plan view of a splice holder of the closure of this invention.
Figure 15:
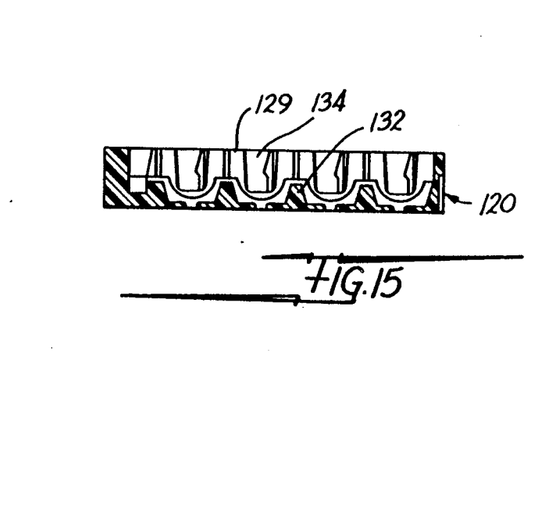
FIG. 15 is an end sectional view taken along lines 15—15 of FIG. 14.

Each splice holder 120 includes a base having a plurality of slotted posts 129—129 upstanding at each end thereof and at two locations intermediate the ends. Extending between posts at each end and at one of the intermediate locations is a partition 132 with nests 134—134 being formed between adjacent partitions and between partitions and sidewalls. Each nest is adapted to receive any one of several splicing connectors such as, for example, AT&T's CSL Lightsplice TM system and rotary mechanical splice and 3M's Fiberlok TM optical fiber splice or to hold fusion splices.

Further, and as can be seen in FIG. 14, nests 134—134 on a side of the center of the splice holder are offset from nests on the other side. It should be observed that the bifurcated posts 129—129 are disposed between adjacent nests. As a result of the position of the posts with respect to the nests and as a result of the offset longitudinally of the nests, the posts on one half of the splice holder are aligned with the nests on the opposite half. Also, at each end of each holder may be positioned a strip 136 of compliant material such as a foam material having a plurality of vertical slits 138—138 therein. Each slit is aligned with two spaced split posts on the adjacent side of the splice holder and with a longitudinal axis of the splicing connector in a nest on the opposite side of the holder. As each fiber extends past the center of a holder, it becomes disposed under an upper hook end of an arm 137.

Each length of foam material also includes additional slits 139—139. Each of the additional slits is aligned with a longitudinal centerline of an adjacent nest. As a result, when a splicing connector is disposed in a nest, the fiber extending therefrom extends through a slit 139 in the foam material adjacent to an outer end of the splicing connector and extends through the two, aligned bifurcated posts and slit 138 of the foam material on the other half of the splice holder. The foam material is effective to help hold the fiber and hence the splicing connector within the nest.

Figure 16:
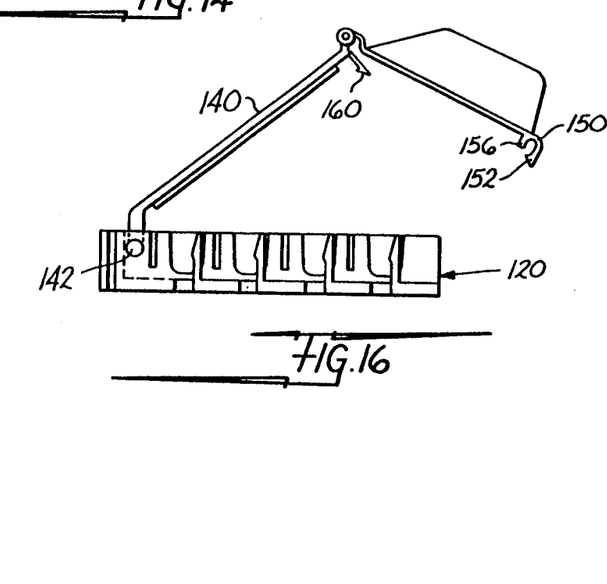
FIG. 16 is an end view of the splice holder of FIG. 14 and showing a lid and a hold-down latch.
Figure 17:
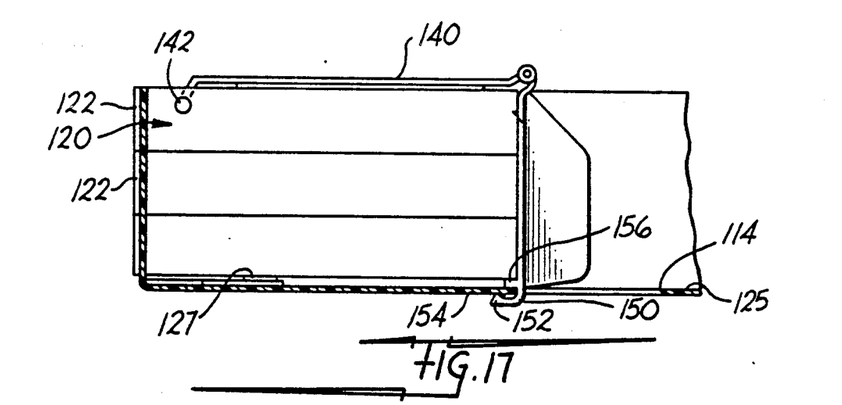
FIG. 17 is an end view of a stack of splice holders and showing the lid and hold-down latch secured.

Disposed on top of the upper one of the stackable holders is a lid 140. In order to attach the lid 140 to the upper one of the splice holders, the lid is provided with oppositely extending pins 142—142 at ends of one side thereof. Each splice holder is provided with holes 144—144 in wall portions 146—146 thereof at opposite ends of the holders. The wall portions 146—146 may be deflected outwardly to allow the pins 142—142 to be inserted into the holes to connect the lid to the upper one of the splice holders.

Also, the lid 140 is provided with a securing hook 150. The securing hook 150 is mounted pivotally to a side of the lid which is opposite to that side from which the pins 142—142 extend. At an end opposite to its pivotal connection to the lid, the hook includes a U-shaped end portion 152. The length of the hook in the preferred embodiment is sufficiently long to extend across three of the stackable holders. With the holders stacked one upon the other, the hook 150 is moved pivotally to cause the U-shaped portion to engage an edge portion 154 of the cutout 114 of the organizer 115. The U-shaped portion is dimensioned to snap-lock onto an edge portion of the cutout 114 to secure together the three stacked splice holders.

The U-shaped portion of the hook performs a dual function. Not only does it secure together the splice holders, but also an innermost leg 156 of the U-shaped portion becomes disposed between the lowermost splice holder 120 and the base of the fiber organizer 115 to hold the lowermost splice holder spaced above the base. As a result, the U-shaped portion of the hook 150 cooperates with the platform 128 to hold the lowermost splice holder above the base 125 of the fiber organizer to allow fiber to be disposed between the lowermost splice holder and the base of the fiber organizer.

Also, as can be seen in FIG. 16, the lid 140 includes two spaced latching portions 160—160. Each of the latching portions 160—160 is adapted to snap-lock into engagement with a lip 162 (see FIG. 14) of an upper one of the splice holders 120—120.

It is also important to recognize that the arrangement of this invention provides ample space in which to route the fibers without going below the minimum bend radius. For example, the splice holders are disposed adjacent to one side edge of the fiber organizer. This allows ample room to route the fiber from incoming cables to one or more of the splice holders with radii above the minimum bend radius. If the splice holders had been disposed in the middle portion of the fiber organizer, the width of the fiber organizer would have had to have been increased in order to maintain suitable bend radii for the fiber. Of course, by holding the width of the fibers organizer to a minimum consistent with suitable bend radii, the size of the closure is controlled, thereby achieving the goal of a reduced size closure for fiber-in-the loop use.

Also, it is important to recognize that the closure of this invention accommodates different splicing devices or connectors. This may be accomplished because of the capability of removing easily one or all of the splice holders and replacing them with holders adapted to receive splice devices or connectors of the desired choice.

As mentioned hereinbefore, the portions of the optical fiber distribution cables 21 and 22 which extend beyond the cable end plate assembly 34 into the cable splice support assembly 32 have the shields and other sheath components removed therefrom. Only a core tube or tubes of each cable extends through the end plate assembly 34 and extends into engagement with the distribution portion 106. If the cable is of the ribbon type, a craftsperson may choose to route ribbons to splice holders without separating fibers and putting them into tubes.

After the splicing has been accomplished as described earlier herein, the craftsperson causes a lid 140 to be applied over the outermost splice holder 120. Then the craftsperson assembles the splicing termination assembly 26 to the cover 28. An O-ring seal is caused to be disposed about the periphery of the arcuate portions 40 and 61 of the end plate assembly 34. The termination assembly 26 is inserted into the cover 28 after which a plurality of over-center clamping hooks 170—170 (see FIG. 1) are caused to become engaged with portions 172—172 of the splice termination assembly to hold the termination assembly in the cover 28. Each of the end plate assembly portions and the O-ring seal cooperate with the cover 28 to seal the closure against the unintended ingress of contaminants or the egress of pressurized air.

In below-ground applications, the volume between the housing portions of the end plate portions 36 and 38 may be filled with a suitable encapsulant. In the alternative, other suitable waterblocking arrangements may be used.

The closure of this invention has many advantages over prior art closures. It has adequate storage capability for fiber-in-the loop use, not only in the number of optical fiber splices that may be stored in each splice holder, but also in the kinds of splicing arrangements which may be accommodated. Also, it is relatively small compared to other commercially available closures and is relatively inexpensive. Also, the closure may be used to splice or connect some of the fibers of a large fiber count cable with the other fibers thereof being passed through the closure.

The fiber organizer has a capacity for three splice holders which are modular and each of which can accommodate eight splices. This is advantageous in that a stack of holders conforms to the six and twelve fiber units and ribbons which are typical in optical fiber cables.

Further, the organizer 115 is capable of having connector holders (not shown) mounted thereon. A connector holder, which is capable of holding optical fiber connectors such as ST® connectors, for example, may have a plurality of projecting pins which are received in openings along a side edge of the organizer which is opposite to the side along which the splice holders 120—120 are disposed. Further, the splice holders 120—120 may be removed and replaced with a connector holder which is adapted to snap-lock into openings in the fiber organizer adjacent to the platform 128.

It is to be understood that the above-described arrangements are simply illustrative of the invention. Other arrangements may be devised by those skilled in the art which will embody the principles of the invention and fall within the spirit and scope thereof.

We claim:

1. An optical fiber cable closure, said closure comprising:

a cover having a closed end and an open end with an axis extending from the open end to the closed end; and a cable termination assembly which is adapted to become disposed within and secured to said cover, said cable termination assembly including:

cable entry means through which cables to be provided with connective arrangements are routed into said closure; and optical fiber support means which extends from and is connected to said cable entry means and which has a free end adapted to be disposed adjacent to said closed end of said cover, said optical fiber support means including:

at least one organizing module which is mounted to said optical fiber support means adjacent to an outer edge of said fiber support means which is parallel to said axis such that fiber to be connected in each said module is routed in paths on said fiber support means with each of said paths having a radius of curvature which exceeds a minimum bend radius of the fiber, each said module including means for holding a plurality of optical fiber connective arrangements which may include different kinds of connective devices and which are such that the longitudinal axes of the fibers in the connective arrangements are parallel to each other and parallel to the axis of the closure, said optical fiber support means being capable of holding a plurality of organizing modules in stacked relationship to one another.

2. The closure of claim 1, wherein said optical fiber support means includes a distribution portion which is connected to and cantilevered from said cable entry means; and fiber organizing means mounted to said distribution means and cooperating with said distribution means to provide a chamber for holding excess fiber length.

3. The closure of claim 2, wherein said cable entry means includes an end plate comprised of two portions which are assembled and held together by a first plurality of fasteners outside the cover and by a second plurality of fasteners within said cover.

4. The closure of claim 3, wherein each said module is formed to include a plurality of parallel, longitudinally extending nests therein, each said nest being aligned with an associated groove at an end of said module such that a fiber that extends from a device in a nest is received in said associated groove.

5. The closure of claim 4, wherein each said nest is aligned with an associated slit in a compliant material such that a fiber that extends from a connective arrangement in a nest is received in said associated groove and in said associated slit.

6. The closure of claim 4, wherein each said module includes opposed sidewalls and a plurality of partitions which are parallel to each other and to said axis and between which are formed said nests.

7. The closure of claim 6, wherein each said module is provided with two rows of said nests such that axes of fibers in devices in one row are parallel to each other and are parallel to axes of fibers in the other row.

8. The closure of claim 7, wherein nests of one row are offset in a direction normal of said axis from nests disposed in the other row.

9. The closure of claim 7, wherein said fiber organizing means is provided with two slotted portions which extend upwardly from a base of said organizing means along an outer edge thereof and each of said modules includes two spaced T-shaped portions projecting from a longitudinal edge thereof, each of said T-shaped portions adapted to be received in one of said slotted portions to hold said module to said organizing means.

10. The closure of claim 9, wherein said fiber organizing means further includes a lid which is adapted to be disposed to enclose an outwardly facing portion of the outermost one of a stack of modules.

11. The closure of claim 10, wherein said lid is adapted to be mounted pivotally to an outermost one of a stack of modules.

12. The optical fiber closure of claim 11, wherein said lid is provided with a hook which includes a U-shaped free end, so that when said lid is connected pivotally to an outermost module, said U-shaped portion is adapted to snap-lock to an edge portion of an inner edge portion of said base of said organizing means to hold a stack of modules together and to said organizing means with a portion of the U-shaped portion which is disposed between an innermost one of a stack of modules and the base of said fiber organizing means being effective to hold said stack of modules spaced from said base of said organizing means a sufficient distance to allow fiber to be routed therebetween.

13. The closure of claim 3, wherein said cable entry portion includes first and second portions each of which includes a partially circular portion adapted to engage a portion of the periphery of the open end portion of said cover, each of said first and second portions including internal and external housing portions which extend normal to said associated partially circular portion, the external and internal housing portions of the first portion cooperating with the housing portions of said second portion to provide a housing having circular entry and exit ports and into which cables to be provided with a connective arrangement extend and from which optical fibers extend to said optical fiber support means.

14. The closure of claim 13, which also includes cable stabilization means disposed within said internal portions of said housing and having facilities for terminating strength members of a cable.

15. The closure of claim 14, wherein said stabilization means includes a bolt to which is connected a stabilizing bar and which projects through a portion of the internal portions of said housing, said stabilizing bar being effective to prevent sheath pullout of cables extending into said closure and to prevent undesired rotation thereof.

16. The closure of claim 15, which also includes grounding means secured to a projecting end portion of said bolt and which includes facilities for establishing an electrical connection to a ground wire which extends through said cable entry means.

17. The closure of claim 16, wherein said cable entry portion includes a relatively thin breakout which is capable of being removed to provide an opening in which is mounted a bushing through which said ground wire extends.

* * * * *